United States Patent

Ilorinne

[11] Patent Number: 6,101,207
[45] Date of Patent: Aug. 8, 2000

[54] DYE LASER

[76] Inventor: Toni Ilorinne, Tiistiläntörmä 5 D 28, FIN-02230 Espoo, Finland

[21] Appl. No.: 09/139,875

[22] Filed: Aug. 25, 1998

[51] Int. Cl.$^7$ .............................. H01S 3/20; H01S 3/04; H01S 3/16; H01S 3/06; H01S 3/093
[52] U.S. Cl. .............................. 372/53; 372/72; 372/35; 372/41; 372/66
[58] Field of Search .................. 372/53, 72, 35, 372/41, 66

[56] References Cited

U.S. PATENT DOCUMENTS

| 4,860,302 | 8/1989 | Janes . | |
|---|---|---|---|
| 4,860,303 | 8/1989 | Russell | 372/72 |
| 5,598,426 | 1/1997 | Hsia et al. | 372/53 |
| 5,624,435 | 4/1997 | Furumoto et al. | 606/10 |
| 5,746,735 | 5/1998 | Furumoto et al. | 606/9 |

Primary Examiner—Frank G. Font
Assistant Examiner—Armando Rodriguez
Attorney, Agent, or Firm—Ladas & Parry

[57] ABSTRACT

A dye laser for generating laser pulses of long duration comprising an optic resonator which comprises an elongated dye cell, which contains light gain medium that can be excited to population inversion, the outputs of the laser pulses from the dye cell being formed of the end surfaces of the cell. There are mirrors placed in optical connection with the outputs of the laser pulses of the dye cell, at least one of the mirrors being partially transmissive for feeding the laser pulse out. Furthermore, means comprising at least one elongated gas discharge lamp are arranged in the longitudinal direction of the dye cell to feed excitation light into the dye cell so that the excitation light sweeps across the cell in the lateral direction of the cell.

6 Claims, 2 Drawing Sheets

DYE LASER

BACKGROUND OF THE INVENTION

The invention relates to a dye laser for generating laser pulses of long duration. The invention particularly relates to a gas discharge lamp-excited high-power dye laser with a long pulse intended e.g. for medical use.

Dye lasers are frequently used in several medical applications, for example in treatment of different vascular lesions by means of selective photothermolysis. Vascular lesions that are treatable with a dye laser include port wine stains, hemangiomas, small varicose veins, facial spider veins, rosacea, disturbing surface veins and scar tissue. In these applications, and especially if the scope of application is to be extended to cover the treatment of vascular lesions formed by blood vessels thicker than 1 mm, laser pulses with a relatively long duration and relatively high energy are necessary. The typical pulse duration achievable with a dye laser is approx. 1 to 1.5 ms and the energy density a few, or at most a few dozens of joules per square centimeter. In the treatment of some vascular lesions a longer pulse duration would, however, be necessary if good results are to be achieved. Dye laser arrangements in which a longer pulse duration has been achieved are known for example from U.S. Pat. Nos. 5,624,435 and 5,746,735.

In the arrangement according to U.S. Pat. No. 5,624,435 a longer pulse has been achieved by changing the lasing dye solution during lasing, in which case the chemical reactions occurring in the dye during lasing, such as photodegradation, which at some point stop lasing, are not as restrictive as in conventional devices in which the dye is not changed during lasing. In the arrangement of the patent in question it is, however, necessary to use high-capacity, high-speed dye pumps which render the device difficult to control and expensive.

U.S. Pat. No. 5,746,735 discloses an arrangement in which the beams of two or more separate laser heads are combined by means of optics so that they can be focused on the target to be treated along one transmission path, such as an optical fiber. The long pulse duration is achieved by triggering the laser heads successively in sequence. This method is very expensive and complicated, since each laser head is an independent unit which needs to be provided with complete resonator optics including the wavelength-selective elements. The problems are emphasized especially when pulses longer than 2 ms are sought for. Since one laser head can generate a pulse with a duration of approx. 1 ms, the generation of a pulse of 10 ms would require 10 laser heads, i.e. 10 separate optic resonators and very complicated and low-efficiency combining optics of beams. Thus the costs of such an arrangement will be very high and its efficiency poor.

SUMMARY OF THE INVENTION

The object of the present invention is to introduce a new kind of dye laser arrangement for generating laser pulses of long duration, in which the problems of the above-mentioned prior art solutions have been eliminated and which allows increase of the pulse length considerably. This object is achieved with a dye laser of the invention. A dye laser of the present invention for generating laser pulses of long duration comprises an optic resonator which comprises an elongated dye cell comprising a space which is defined by two elongated and substantially parallel main surfaces and by side and end surfaces connecting the main surfaces and contains light gain medium that can be excited to population inversion, the distance of the main surfaces from each other being substantially smaller than their length in the longitudinal direction of the dye cell, and the outputs of the laser pulses from the dye cell being formed by said end surfaces;

mirrors placed in optical connection with the outputs of the laser pulses of the dye cell, at least one of the mirrors being partially transmissive for feeding the laser pulse out; and means comprising at least one elongated gas discharge lamp arranged in the longitudinal direction of the dye cell for feeding excitation light into the dye cell so that it sweeps across the cell in the lateral direction of the cell.

The means for making the excitation light sweep across the dye cell advantageously comprises at least two elongated gas discharge lamps arranged in the longitudinal direction of the dye cell and spaced from each other in the lateral direction of the dye cell for feeding light energy into the dye cell, in which case each gas discharge lamp is arranged to be fed by a pulse forming network of its own, the pulse forming networks being controlled by a common control circuit for lighting the gas discharge lamps successively in the lateral direction of the dye cell.

According to the most preferred embodiment of the invention, the discharge lamps are positioned alternately on the different sides of the dye cell near its opposite main surfaces.

In accordance with the foregoing, the dye laser of the invention utilizes a dye cell, which in addition to its length also has a clear lateral dimension, and the lasing is made to sweep across the cell in the lateral direction either by means of a suitable opto-mechanical structure which produces a motion between the discharge lamp and the dye cell, or most preferably by means of several gas discharge lamps lit synchronously one after another, which allows increase in the duration of the generated laser pulse considerably.

In the most preferred embodiment the main surfaces of the dye cell comprise at least part of the envelope surface of two substantially coaxial cylinders, while the longitudinal direction of the dye cell is parallel to the generatrix of the cylinder surfaces. In this preferred embodiment the lateral dimension of the dye cell has an arched shape corresponding to the arc of a circle, or in extreme cases to its whole circumference, whereby it is quite simple to synchronize the sweep and to control it with a suitable Q-switch. For this purpose the invention advantageously also comprises a Q-switch arranged between one end surface of the dye cell and the mirror feeding out the laser pulse, the Q-switch allowing optical connection between the mirrors only at a limited point of the end surface of the dye cell and allowing to move said point synchronously with the progression of lasing. Such an adaptive Q-switch is used to control linearly the Q-factor of the part of the resonator which is made to emit laser radiation at a given time for example by means of sequential control of the discharge lamps. The operation is controlled by means of the control system in such a manner that on an axis parallel to the resonator the Q-factor is high at that part of the resonator where the population inversion, i.e. lasing, occurs at a given time. This synchronous operation enables generation of laser light pulses the duration of which is at least 1000 $\mu$s. If the dye cell is large enough and the excitation parameters of the gain medium are optimal, it is possible to generate extremely long high-power laser light pulses, for example a pulse the duration of which exceeds 20 ms and which has more than 40 J of energy. Such long and high-energy light pulses allow to achieve optimal treatment parameters e.g. in selective photothermolysis mentioned above.

To facilitate focusing of the laser pulse output from the dye laser of the invention it is advantageous that the Q-switch used in the dye laser of the invention comprises a rotatable disc provided with a hollow shaft, a sweep mirror arranged on the circumference of the disc, the orbit of the sweep mirror matching with the end surface of the dye cell when the disc is rotated so as to receive a laser pulse from the dye cell and to reflect it on a level with the disc towards its middle axis, and a middle mirror arranged on the middle axis of the disc to receive the laser pulse transmitted by the sweep mirror and to turn it to pass through the hollow shaft of the disc to the partially transmissive mirror that feeds the laser pulse out.

BRIEF DESCRIPTION OF THE DRAWINGS

In the following, the dye laser of the invention will be described in greater derail with reference to the accompanying drawings, in which.

DETAILED DESCRIPTION OF THE INVENTION

Figure 1:
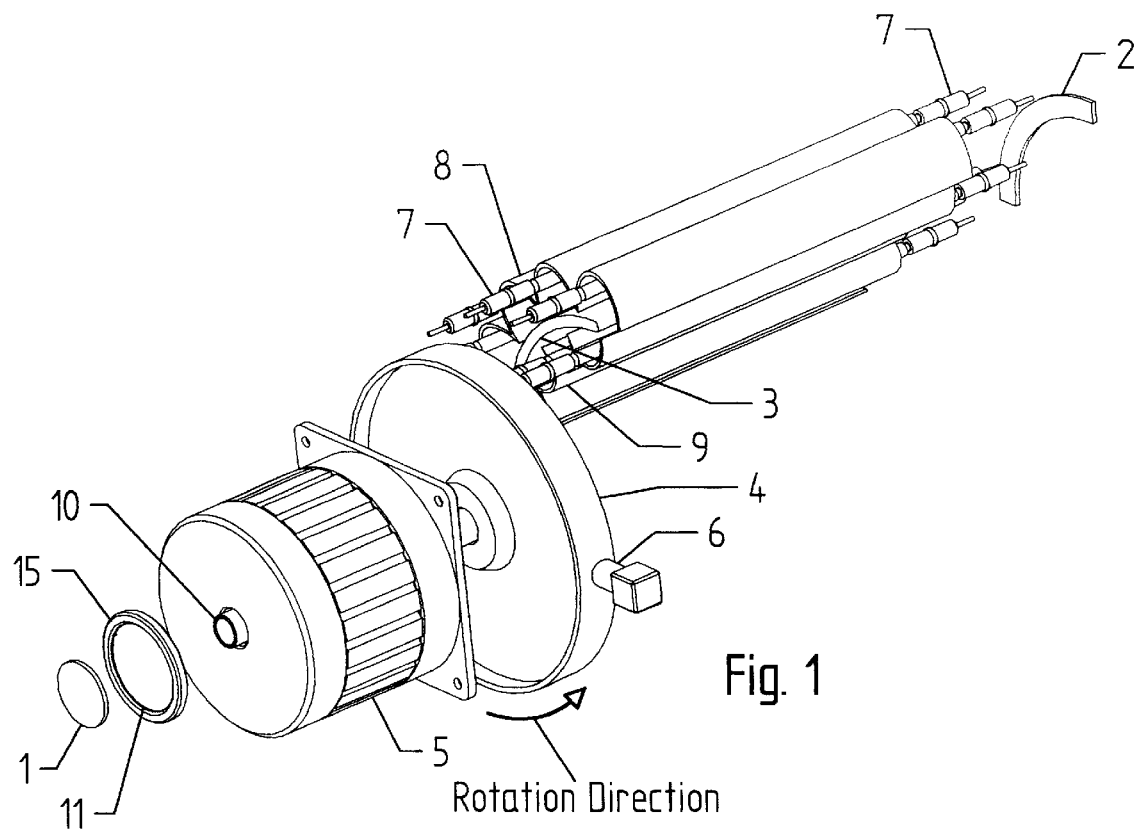
FIG. 1 is a kind of exploded view illustrating essential elements of a dye laser of the invention, the elements being in the correct position with respect to one another.

FIG. 1 is a kind of exploded view of the most preferred embodiment of the invention. The figure shows the functional elements essential to the invention in such position with respect to one another in which they are in the laser. However, separate support arrangements for different elements are not shown for the sake of clarity.

The optical resonator of the dye laser illustrated in FIG. 1 is formed between mirrors 1 and 2, of which mirror 1 is partially transmissive and functions as the output mirror of the laser. This mirror 1 may be a conventional circular and partially transmissive mirror used in laser devices. The other mirror 2 has an arched shape corresponding to a part cut from an annular mirror. The reason for this shape appears from FIG. 2. The optic resonator illustrated in FIG. 1 further comprises a dye cell 3 and discharge tubes 7 arranged to feed light energy thereto, such as high intensity Xenon discharge tubes, e.g. Philips XOP 25-OF, having a diameter of 12 mm, discharge length of 457 mm and discharge energy of 2000 J/s. There are parabolic reflectors 8 and 9 arranged around these discharge tubes. The dye laser of FIG. 1 also comprises a Q-switch 4 the position of which is monitored by a position transducer 6. The structure and operation of this Q-switch will be described more closely in connection with FIGS. 3 and 4. In practice, its purpose is to allow optical connection between the mirrors 1 and 2 only synchronously with the lighting of the discharge lamps 7. This optical connection is established via the Q-switch and the hollow shaft 10 of a servomotor 5 rotating it, as will be described in greater detail later on. Furthermore, a wavelength-selective element, i.e. interference filter 11, such as Fabry-Perot Etalon, is arranged with the optical resonator in a conventional manner.

It should be noted that the laser sweep across the dye cell can also be implemented in another way differing from the preferred embodiment illustrated in FIG. 1. One alternative is a structure which utilizes only one discharge lamp and an opto-mechanical structure which produces a motion between the dye cell and the discharge lamp, the motion making the excitation light sweep across the cell in its lateral direction. In this arrangement the light could be arranged to light the arched dye cell like a lighthouse.

Another alternative to the arrangement of FIG. 1 is an arrangement in which the discharge lamps are arranged in the same way as in FIG. 1 except that the lamps are arranged near only one main surface of the dye cell. In that case the dye cell is advantageously relatively thin and possibly comprises a reflector on the side opposite the discharge lamps of the cell for reflecting the light that has passed through the dye cell back to the dye cell.

Figure 2:
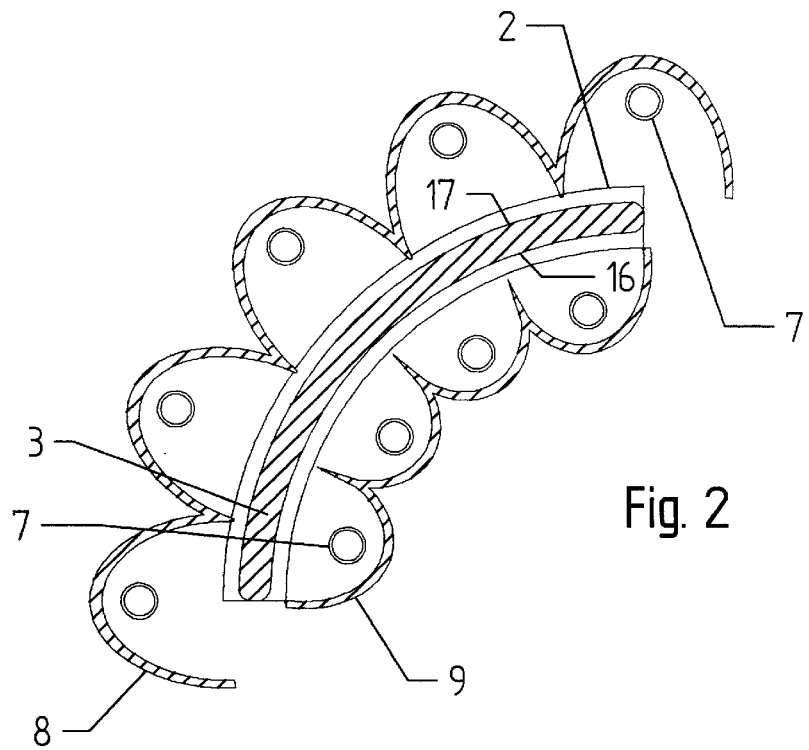
FIG. 2 is a cross-sectional view of a dye cell and discharge lamps of the laser according to FIG. 1.

FIG. 2 illustrates a cross-sectional view of the dye cell of the dye laser according to FIG. 1 and the discharge lamps that are arranged to feed light energy into the cell. In FIG. 2 the discharge lamps are indicated by reference numeral 7, the reflectors of the discharge lamps on the outer circumference by reference numeral 8 and the reflectors of the discharge lamps on the inner circumference by reference numeral 9. The dye cell itself is designated by reference numeral 3. A mirror 2 can also be seen from behind the dye cell. The shape of the mirror corresponds to that of the dye cell, although it is slightly broader than the end of the cell.

The dye cell 3 comprises a space defined by two elongated and substantially parallel main surfaces 16 and 17 and by side and end surfaces connecting the main surfaces. The dye cell is filled with a solid or liquid light gain medium that can be excited to population inversion, which is conventional in connection with dye lasers. As it appears from FIGS. 1 and 2, the distance between the main surfaces 16 and 17 is substantially smaller than their length in the longitudinal direction of the dye cell. In practice the dye cell may be for example 1 to 4 mm thick, whereas its length may vary for example from 30 to 50 cm. When the laser is in operation, the laser pulses exit from the dye cell through its end surfaces.

As it appears from FIG. 2, the main surfaces 16 and 17 of the dye cell 3 comprise part of the envelope surface of two substantially coaxial cylinders. In the embodiment of FIG. 2 this envelope surface covers one fourth of the envelope surface of the cylinder, but according to the invention, this proportion can be increased if necessary depending on what the desired longest duration of the generated laser pulse is. Thus the dye cell could even be a complete circle.

There are discharge lamps 7 arranged at regular intervals on the opposite sides of the dye cell. These discharge lamps are positioned alternately on the different sides of the dye cell so that if we proceed in the lateral direction of the dye cell, a discharge lamp on the outer main surface of the dye cell is followed by a lamp on the inner main surface, which is in turn followed by a lamp on the outer main surface. Thus the discharge lamps are arranged into a kind of zigzag pattern in the lateral direction of the dye cell. The parabolic reflectors 8 surrounding the discharge lamps 7 on one side of the dye cell are arranged so that the point of contact of two parabolic reflectors approximately matches with the discharge lamp on the other side of the dye cell.

If desired, the shape of the reflector may deviate from the parabolic shape described above, if it is useful that the excitation light is not distributed evenly on the area of the segment covered by one lamp. It is possible that the most preferred reflector shape is such that it forms a lighting pattern where the light intensity is highest at that part of the segment where lasing occurs first and then gradually decreases towards the back edge of the segment. The reason for this is that the front part of the segment has less time to excite to population inversion than the back part.

Figure 5:
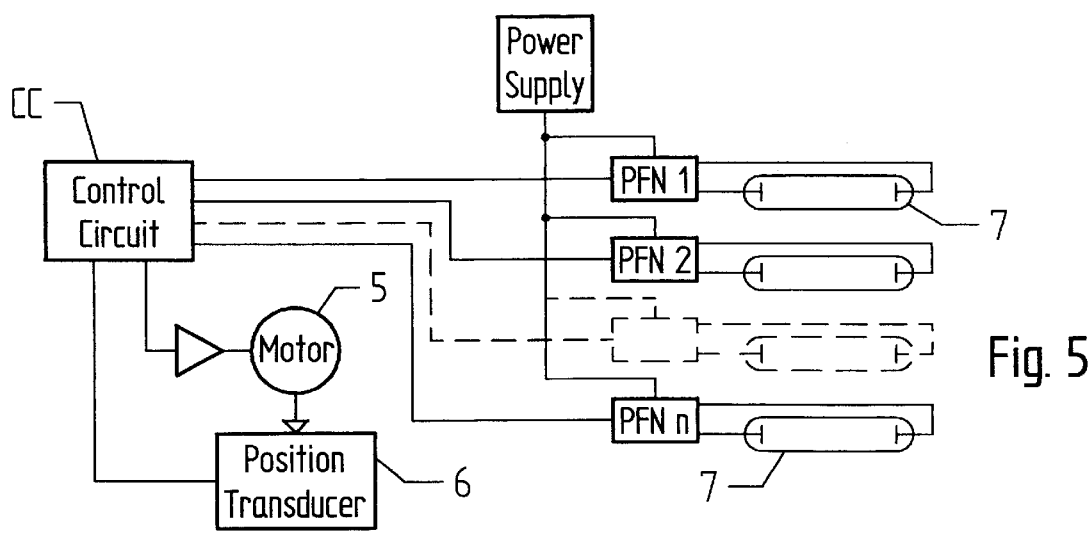
FIG. 5 illustrates electrical coupling of the discharge lamps of the dye laser according to FIG. 1.

The discharge lamps 7 are lit successively in sequence by means of the arrangement shown in FIG. 5 in such a manner that in the arrangement of FIG. 2 the outermost discharge lamp on the outer circumference is lit first, then the outermost discharge lamp on the inner circumference, thereafter the second outermost discharge lamp on the outer circumference, etc. Lighting proceeds synchronously in such a manner that the next discharge lamp on the other side of the dye cell is always lit slightly before the previous discharge lamp has gone out. This allows to transmit the light energy fed into the dye cell evenly in the lateral direction of the dye cell, i.e. to sweep across the dye cell in the lateral direction. As a result, the lasing occurring in the dye cell also proceeds by sweeping across the dye cell in the lateral direction. This allows to increase the pulse length substantially compared to a situation in which the whole dye cell would be excited simultaneously.

It should be noted that even though the dye cell has been illustrated as part of the arc of a circle in the arrangement of FIG. 2, the dye cell could also be implemented as a planar cell, in which case the discharge lamps would also be positioned at regular intervals on the both sides of the dye cell into a zigzag pattern. In such an arrangement lasing would proceed in the dye cell linearly and synchronously with the operation of the discharge lamps in the lateral direction of the cell. The adaptive Q-switch should allow such a linear path, unlike the Q-switch which is illustrated in FIGS. 1 and 2 and implemented as a rotating disc, the speed of rotation of the disc being synchronized with the lighting of the discharge lamps.

Figure 3:
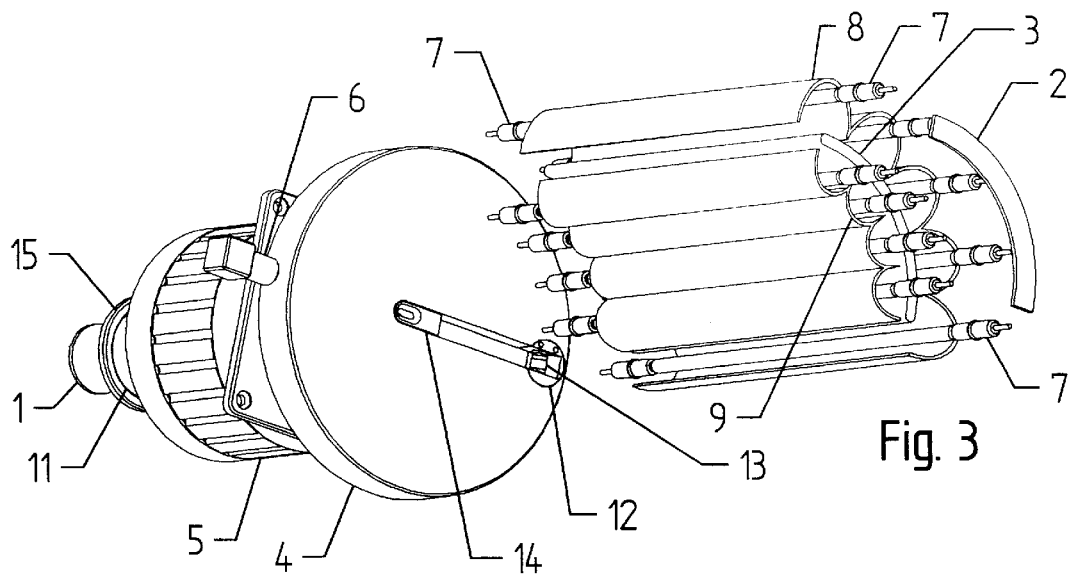
FIG. 3 illustrates the arrangement according to FIG. 1 from the opposite direction.
Figure 4:
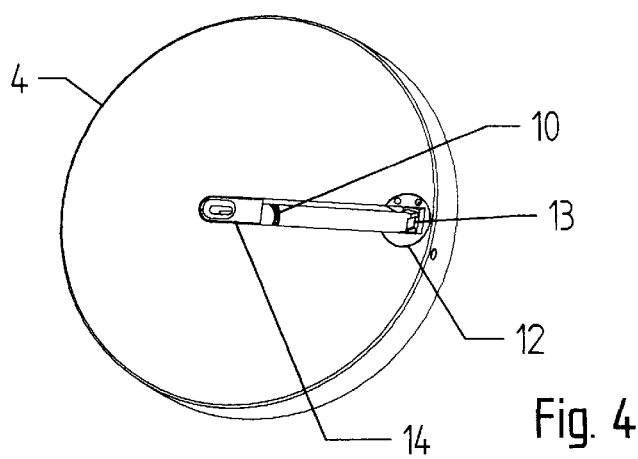
FIG. 4 illustrates a Q-switch of the dye laser according to FIG. 1 from the opposite direction with respect to FIG. 1.

FIG. 3 illustrates the arrangement of FIG. 1 from the opposite direction, showing especially the structure of the Q-switch 4 in greater detail. The Q-switch is also illustrated in greater detail in FIG. 4. The Q-switch 4 is discoid and a sweep mirror 13 is arranged near its outer circumference, the mirror being supported by an installation member 12. The sweep mirror is arranged on the circumference of the disc so that when the disc is rotated, its path is co-radial with the end surface of the dye cell 3 and sweeps across the end surface of the dye cell 3 at a constant distance in order to receive a laser pulse from the dye cell and to reflect it on a level with the disc towards the middle axis of the disc. On the middle axis of the disc a mirror 14 receives the laser pulse and turns the pulse to pass through the hollow shaft in the direction of the shaft 10. According to FIG. 1 the pulse, when exiting from the shaft 10, first touches the wavelength-selective element 11 and then one mirror 1 which is a partially transmissive mirror and thus forms the output of the dye laser of the invention.

FIG. 5 describes the above-mentioned arrangement for igniting the discharge tubes 7 of the dye laser according to the invention synchronously. For this purpose each discharge lamp 7 is arranged to be fed by its own power feed network or pulse forming network which are indicated by reference symbols PFN1, PFN2, etc. up to PFNn. Thus FIG. 5 is based on the idea that there are N discharge lamps and thus also N pulse forming networks. These pulse forming networks PFN1 . . . PFNn are controlled by a control circuit CC, which lights the discharge lamps 7 in a sequence progressing in the lateral direction of the dye cell, as was described above. In the dye laser of the invention the high excitation energy required by the dye cell is divided into short pulses between several gas discharge lamps 7, which considerably decreases the stress to which they are subjected, increases their service life and enables simpler cooling arrangements.

In practice, the pulse length of the dye laser of the invention can be adjusted steplessly by varying the sweep rate and by selecting the number of the segments active in a sweep. The segments that were not triggered during the previous sweep can be activated the next time, which allows generating several shorter pulses without changing the dye solution.

The dye laser of the invention has been described above primarily by means of one embodiment which is considered to be the best mode. As it has been shown, the inventive concept of controlling lasing so that it sweeps across a dye cell in the lateral direction could also be applied to cases in which the shape of the dye cell differs from the described arched shape and is for example planar. In that case there would be no limit to the width of the cell nor to the duration of the generated laser pulse. In such linear arrangements focusing of the laser pulse on one point could not be implemented as simply as in the embodiment described above in which this was achieved by means of a rotating Q-switch. Thus the dye laser of the invention may be modified without deviating from the scope of the accompanying claims or from the basic idea of the invention according to which population inversion proceeds in the gain medium contained by the dye cell in the lateral direction of the dye cell as the function of time and is brought about either by a sweep generated by the motion between the dye cell and the discharge lamp or by means of sequential control of several discharge lamps, such as discharge lamps positioned alternately on the different sides of the dye cell.

What is claimed is:

1. A dye laser for generating laser pulses of long duration comprising an optical resonator which comprises an elongated dye cell comprising a space which is defined by two elongated and substantially parallel main surfaces and by side and end surfaces connecting the main surfaces and containing a light gain medium that can be excited to population inversion, the distance of the main surfaces from each other being substantially smaller than their length in the longitudinal direction of the dye cell, and the outputs of the laser pulses from the dye cell being formed by said end surfaces;

mirrors placed in optical connection with the outputs of the laser pulses of the dye cell, at least one of the mirrors being partially transmissive for feeding the laser pulse out; and means comprising at least one elongated gas discharge lamp arranged in the longitudinal direction of the dye cell for feeding excitation light into the dye cell so that the excitation light periodically sweeps across the cell in the lateral direction of the cell as a function of time.

2. A dye laser according to claim 1, wherein said means for making the excitation light sweep across the dye cell comprises at least two elongated gas discharge lamps arranged in the longitudinal direction of the dye cell and spaced from each other in the lateral direction of the dye cell for feeding light energy into the dye cell, in which case each gas discharge lamp is arranged to be fed by a respective pulse forming network, the pulse forming networks being controlled by a common control circuit for lighting the gas discharge lamps successively in the lateral direction of the dye cell.

3. A dye laser according to claim 2, wherein said discharge lamps are arranged alternately on different sides of the dye cell near its opposite main surfaces.

4. A dye laser according to claim 1, wherein the main surfaces of the dye cell comprise at least part of an envelope surface of two substantially coaxial cylinders, while the longitudinal direction of the dye cell corresponds to the direction of the generatrix of the cylinder surfaces.

5. A dye laser according to claim 1, further comprising a Q-switch arranged between one end surface of the dye cell and the mirror feeding out the laser pulse in order to allow optical connection between the mirrors only at a limited point of the end surface of the dye cell and to move said point synchronously with the progression of lasing.

6. A dye laser according to claim 5, wherein the Q-switch comprises a rotatable disc provided with a hollow shaft, a sweep mirror arranged on the circumference of the disc, the orbit of the sweep mirror matching with the end surface of the dye cell when the disc is rotated so as to receive a laser pulse from the dye cell and to reflect the laser pulse on a level with the disc towards its middle axis, and a middle mirror arranged on the middle axis of the disc to receive the laser pulse transmitted by the sweep mirror and to turn it to pass through the hollow shaft of the disc to the partially transmissive mirror that feeds the laser pulse out.

* * * * *